Feb. 2, 1954  F. D. BUTLER  2,667,744
INTERNAL-COMBUSTION TURBINE
Filed Dec. 6, 1951  5 Sheets-Sheet 1
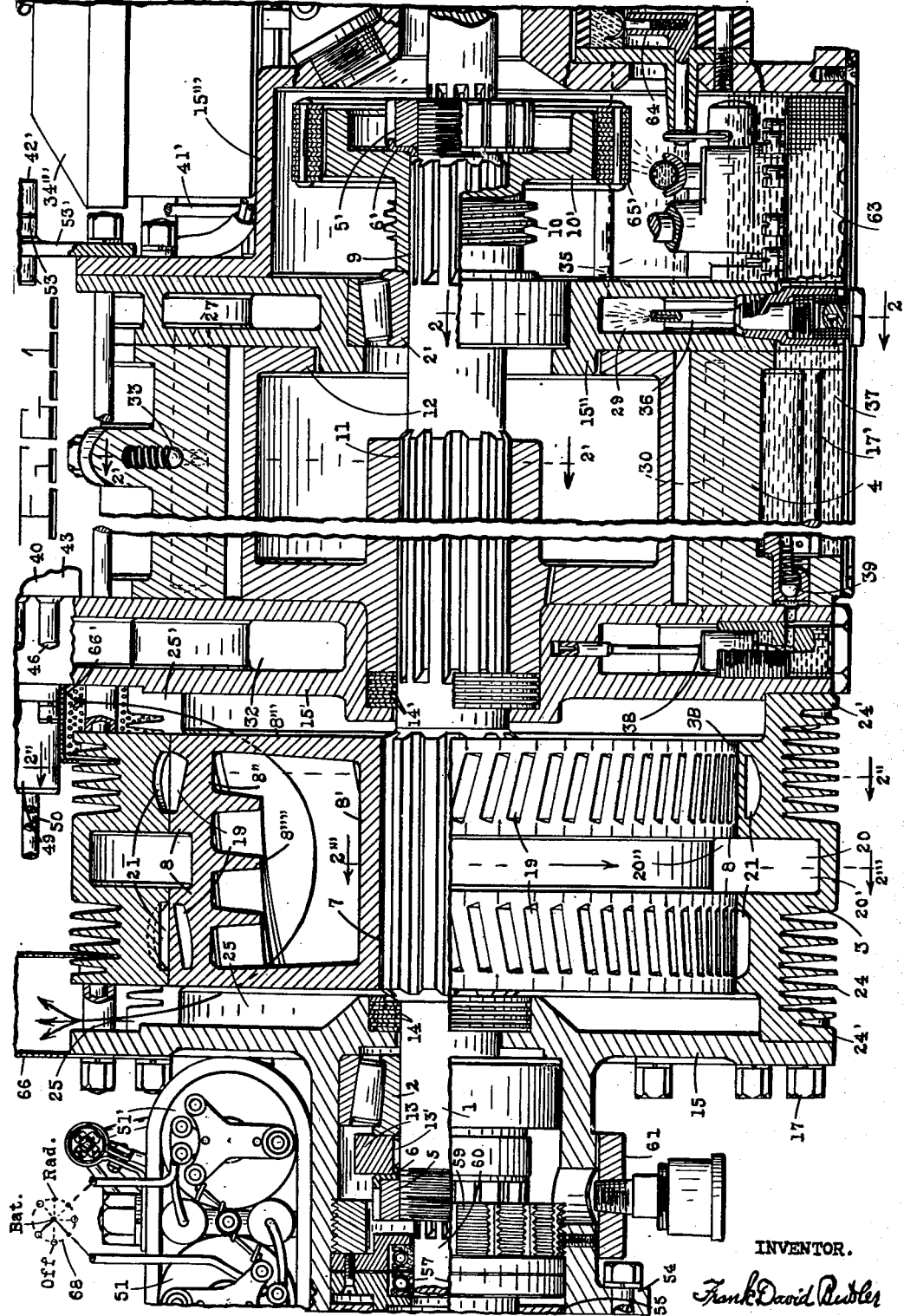
INVENTOR.
Frank David Butler

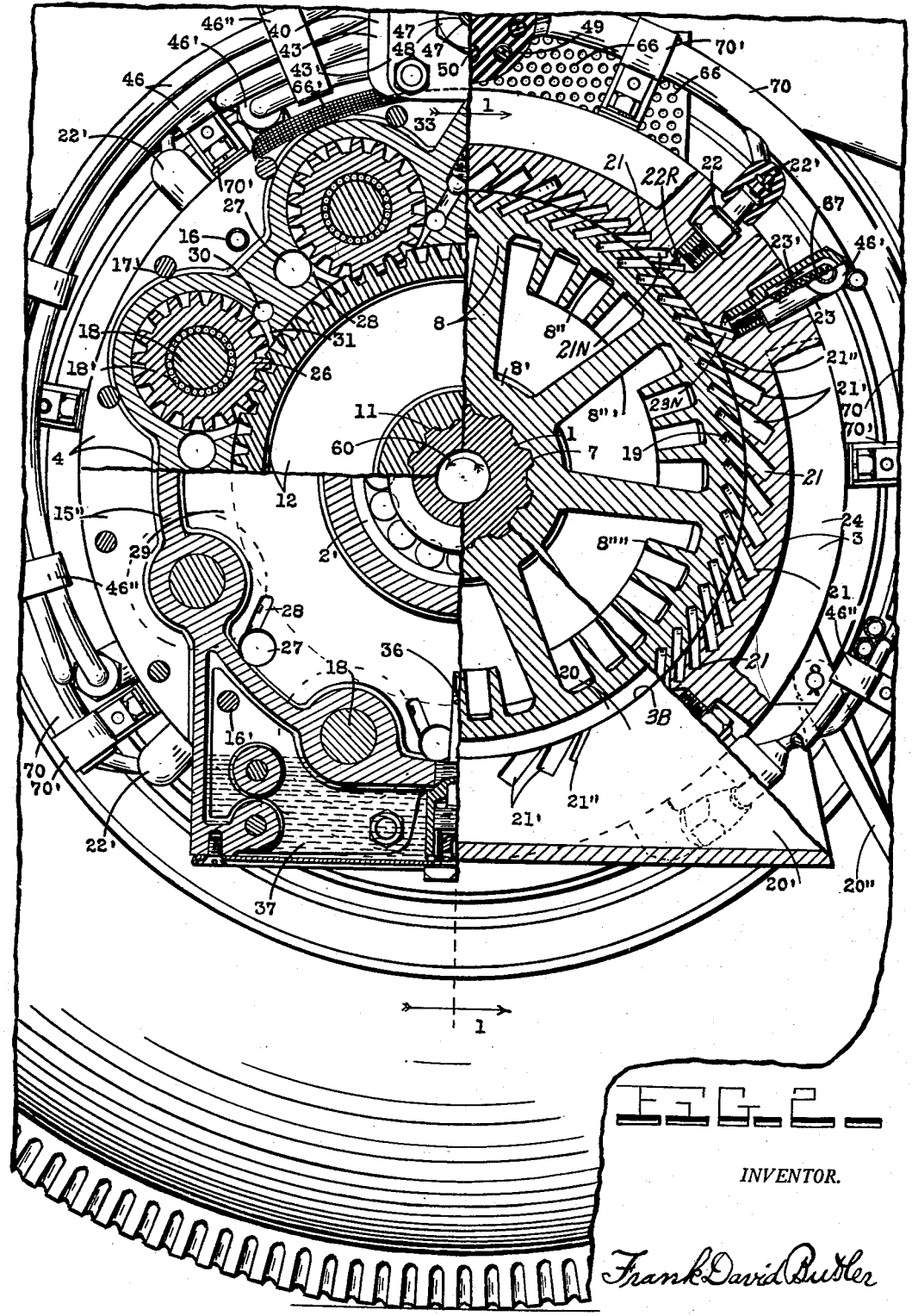

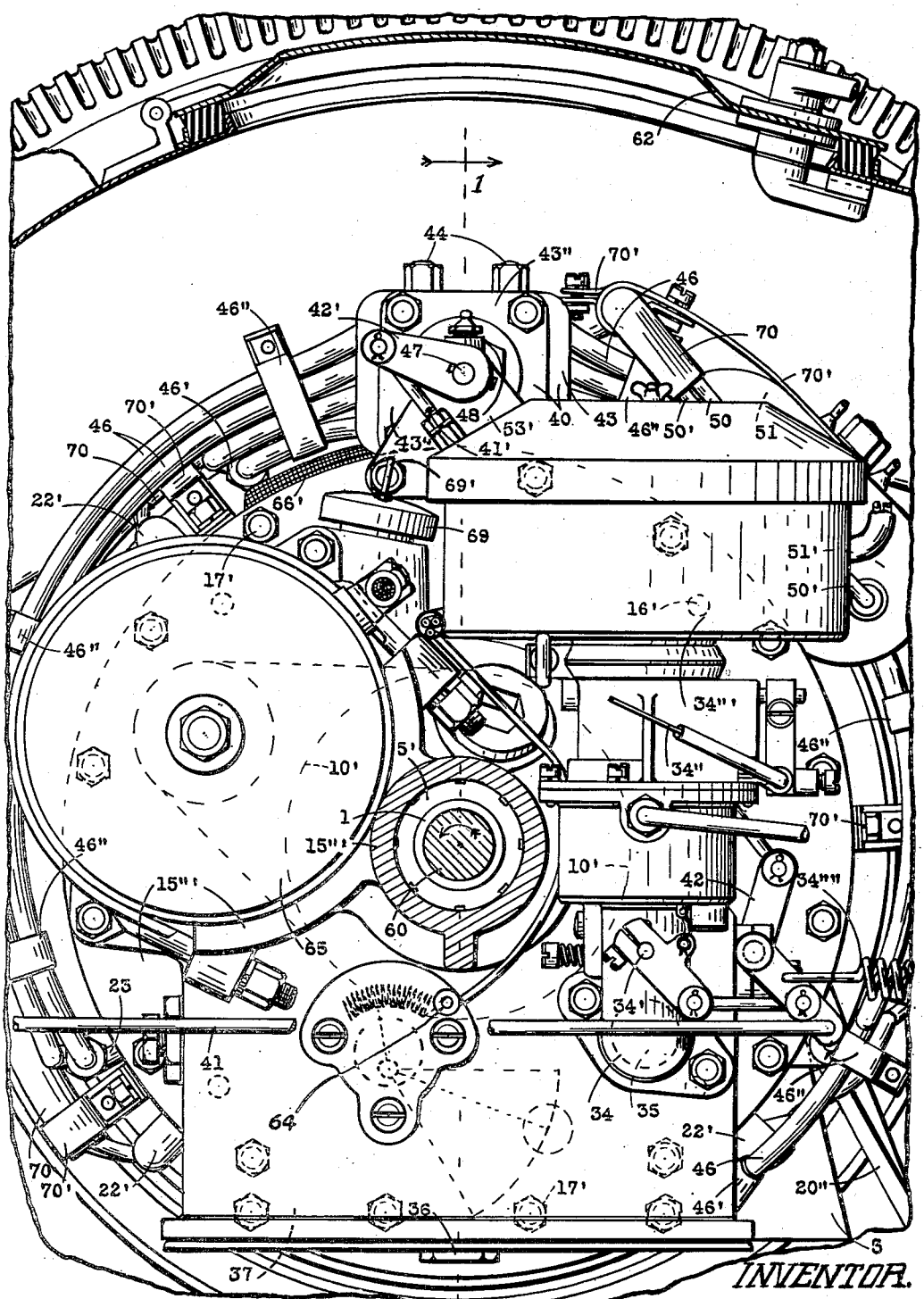

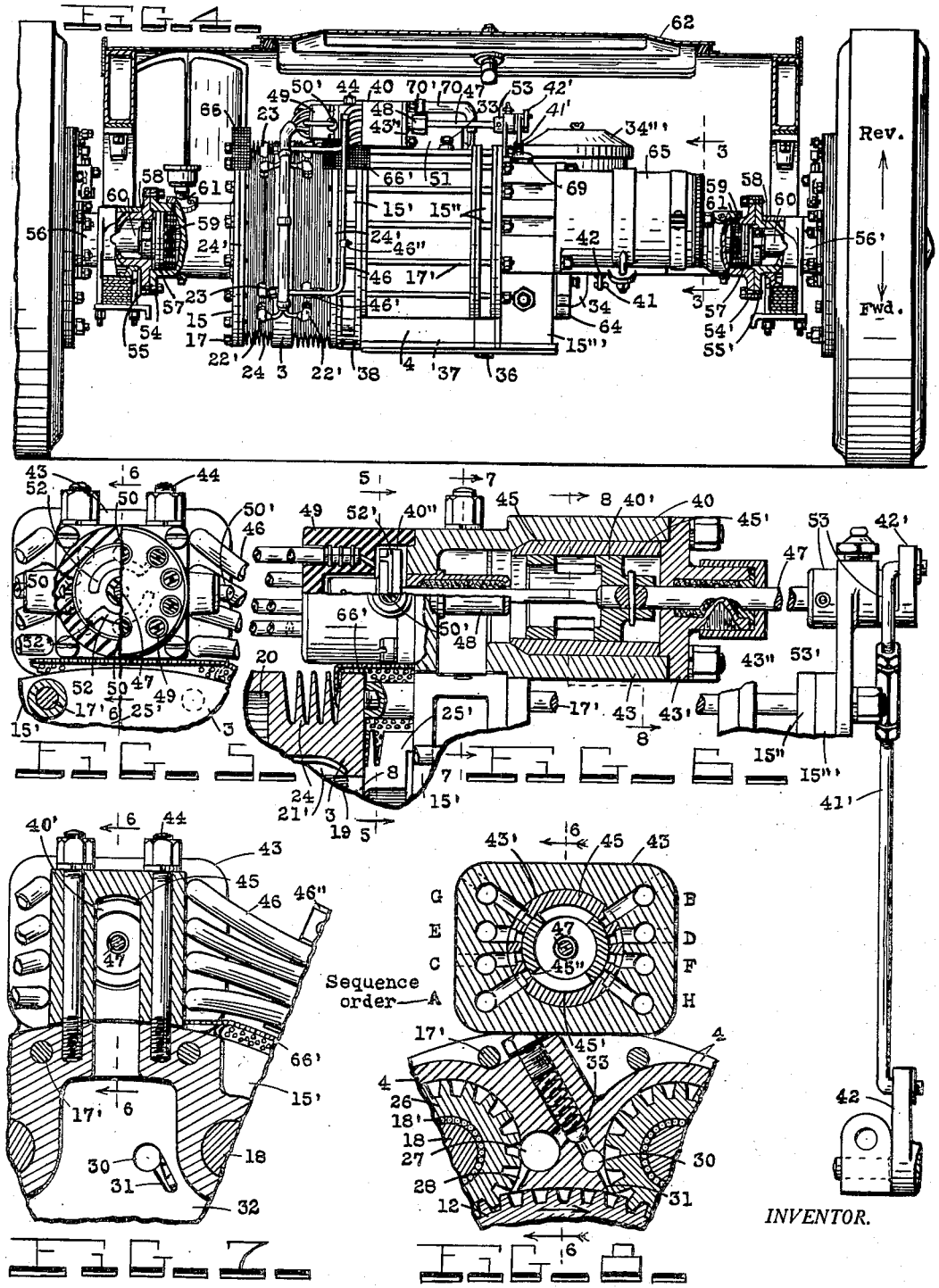

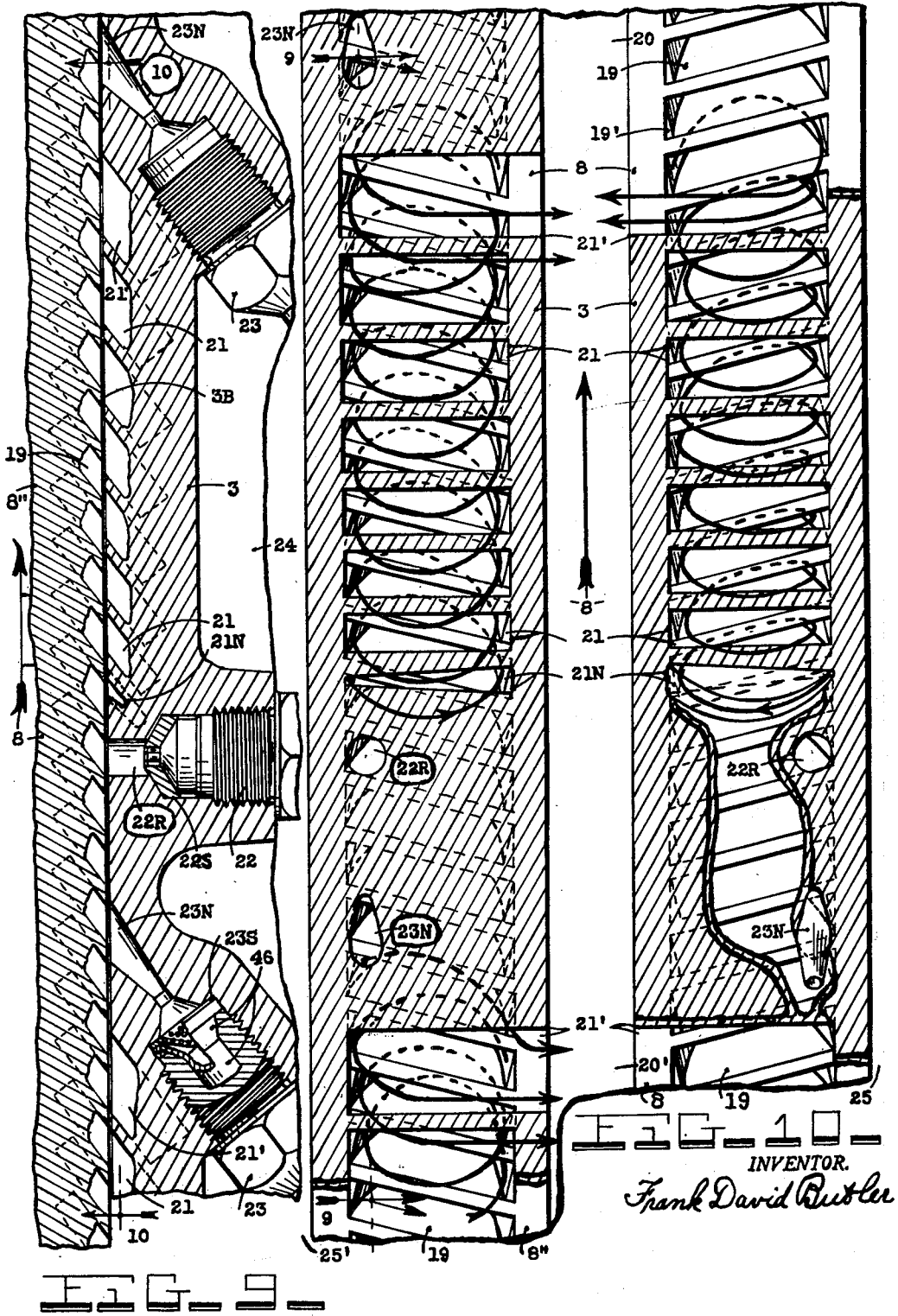

Patented Feb. 2, 1954

2,667,744

UNITED STATES PATENT OFFICE 2,667,744

INTERNAL-COMBUSTION TURBINE

Frank David Butler, Venice, Calif.

Application December 6, 1951, Serial No. 260,157

14 Claims. (Cl. 60—39.34)

In general my invention relates to internal combustion turbines for use wherever applicable and particularly for application as a motive power means for automotive drive purposes.

While the main motive of this invention is to provide an internal combustion turbine having substantially a constant compression pressure on the combustible fuel mixture at the time of its ignition, regardless of the torque load and speed of rotation of the turbine, and a continuous expansion and flow of the products of combustion, there are numerous other conditions that must be met both to make this possible and in order to produce a turbine that will operate efficiently at all speeds and under varying torque load conditions. Some of these conditions that must be met include the following: the provision of a positive type of drenched gearing fuel mixture compression means; a means of metering the compressed fuel mixture according to the torque load applied to the turbine; a variable ignition distributing means; a means of synchronizing said fuel mixture metering means with the carburetor throttle-valve opening and closure and also with said variable ignition distributing means; and, a means of providing continuous combustion and power delivery.

Other objects of this invention include the combining and coordinating of the various features mentioned in an internal combustion turbine assembly, and other minor improvements in this art that will be noted as the specification description progresses.

As a matter of information to the reader, it is my intention of applying this internal combustion turbine assembly as the motive power means, in connection with an automotive vehicle and forming the intermediate portion of the rear axle housing thereof, for driving a pair of my combined hydrodynamical and compounded planetary gearing driven, internal fluid pressure variable and reversible transmission couplers with one of the latter forming the hub proper of each rear wheel assembly.

With reference to the accompanying drawings forming a part hereof: Fig. 1 is a broken away and longitudinal section, partly in elevation, of my internal combustion turbine assembly in general and as it would appear on the dotted and broken lines 1—1 of Figs. 2 and 3. Fig. 2 is a broken away and transverse section, partly in elevation, of the turbine assembly with the lower left quarter of the figure as it would appear on the dotted and broken line 2—2 of Fig. 1, the upper left quarter illustrates the fuel mixture compressor gearing and as it would appear on the dotted and broken line 2'—2' of Fig. 1, the right one-third illustrates the turbine buckets and is as the turbine would appear on the dotted and broken line 2''—2'' of Fig. 1, and, the lower right one-sixth illustrates the exhaust outlet and is as the turbine would appear on the dotted and broken line 2'''—2''' of Fig. 1; Fig. 3 is a broken away and end elevation of the turbine assembly, partly in section, and illustrates the general location of the various parts of the assembly and as they would appear on the dotted and broken line 3—3 of Fig. 4; the latter figure illustrates the turbine assembly as applied as the motive power means for driving a pair of my variable speed reducing and rotation reversing fluid power couplings with one of the latter mounted in each rear wheel assembly of an automobile, and as the entire combined assemblies would appear from under such automobile and looking towards the rear thereof; Fig. 5 illustrates the combined compressed fuel mixture metering and variable ignition distributing device, with the right one-half of the figure being an end elevation of the adjacent Fig. 6, and the left one-half as it would appear on the dotted and broken line 5—5 of Fig. 6; the latter figure is a broken away and longitudinal section, partly in elevation, of this combined device just mentioned and as it would appear on the dotted and broken lines 6—6 of Figs. 5, 7 and 8; Fig. 7 is a transverse section on the dotted and broken line 7—7 of Fig. 6; Fig. 8 illustrates this device as it would appear on the dotted and broken line 8—8 of Fig. 6; and Figs. 9 and 10 are schematic diagrams of means for compounding the products of combustion in the turbine, Fig. 9 being a section on the line 9—9 of Fig. 10 while the latter is a section on the line 10—10 of Fig. 9.

With further reference to the drawings, similar numerals indicate similar parts in the several views and figures: the numeral 1 indicates the elongated tubular turbine shaft which is provided to be journalled and rotated on a pair of tapering and adjustable roller bearings 2 and 2' concentrically within the elongated cylindrical turbine stator casing 3 and also within the elongated gear housing 4 and to be adjustable in said bearings by the adjustment nuts 5 and 5' which latter are locked in place with their respective locking washers 6 and 6'; said shaft 1 is provided with a relatively large diameter integral spline 7 over which the elongated and cylindrical internally splined turbine rotor 8 is a shrink-fit, a relatively small diameter integral spline 9 over which the internally splined combined worm 10 and sprocket gear 10' is a slidable-fit, and an intermediate diameter integral spline 11 over which the elongated internally splined compressor drive sun-gear 12 is a slidable-fit; an accentric 13 is provided for operating a gasoline pump and is keyed to shaft 1 with the half-moon key 13'; a plurality of series of alternate metal and fiber annular shaped discs 14 and 14' are provided for purpose of seals for preventing fluid and/or grease leakage along the periphery of shaft 1 and into the turbine casing 3; because of the necessity of extremely close alinement between the turbine casing and the gear housing concentrically with the axis of shaft 1, the counterbores of bore 3B form a rabbet type joint with the combined head-plate and shaft housing 15 on one end and the head-plate 15' at the other end, and the gear housing 4 and the combined auxiliary and shaft housing 15''' are in turn held concentrically with the axis of shaft 1 and gear 12 by a plurality of dowel-pins 16 and 16', the former alining head-plate 15' with one end of gear housing 4 and the other set alining the opposite end of gear housing 4 with the head-plate 15'' and the housing 15'''; a series of symmetrically spaced stud-bolts and/or cap-screws 17 secure one end of the turbine casing 3 to the head-plate and housing 15 and a series of symmetrically spaced stud-bolts 17' secure the opposite end of the turbine casing 3, the head-plate 15', the gear housing 4, the head-plate 15'' and the head-plate and housing member 15''' altogether as an assembly; and, the series of, heat-treated and hardened, planet-gearing journal pins 18 are similarly symmetrically spaced about the axis of shaft 1 and drive gear 12 and are each a press-fit into the head-plates 15'' and 15' and also tend to hold these head-plates in alinement.

As the turbine herein illustrated is intended for driving a pair of my reversible traction wheel couplers, the rotor 8 was provided to be rotated in one direction only and to consist of: an elongated internally splined hub portion 8' and an elongated annular shaped rim portion 8'' integral with a series of symmetrically spaced spokes, and/or blades, 8''' which extend radially and helically longitudinally through said rim and connect the latter to said hub portion; a series of symmetrically spaced diagonally extending combustion chambers 19 located in preferably two rows in the periphery of said rim 8' and machined in the form of half-moon shaped buckets extending tangentially thereinto the latter in the direction of rotor rotation and with each row preferably extending diagonally opposite to one another in herringbone manner; and, an annular shaped exhaust passage 20 located jointly in said rotor 8 and the turbine stator casing 3 and having communication through the latter at 20' to the atmosphere.

The elongated, annular shaped turbine stator casing 3 consists of: an annular shaped exhaust passage 20 which is located intermediately in the length of such stator and terminates near the bottom thereof in an access outlet 20' covered over with a hinged non-return check-valve cover plate 20''; a main bore 3B, extending on both sides of passage 20, provided to rotatably receive said turbine rotor 8; two rows of series of groups, of series of symmetrically spaced curved expansion chamber buckets 21, wherein each group consists of a series of consecutively progressively increasing in capacities of such buckets with each extending tangentially from said bore 3B into said stator 3 in opposite to the direction of rotation of said rotor therein; two rows of series of alternately spaced ignition plugs 22 and fuel mixture delivery plugs 23, with each of the former terminating in a recess 22R within the bore 3B, and each of the nozzle plugs 23 terminating in a tapering diffuser nozzle 23N which latter extends tangentially into said bore 3B and has its larger diameter end terminating therein such bore in the direction of rotor rotation therein, and wherein in each of said groups one of said delivery nozzle plugs 23 and one of said ignition plugs 22 are paired in series with the series of expansion chamber buckets in forming a power cycle of operations producing group, wherein each such group consists of one diffuser nozzle 23N, one ignition plug 22 with its recess 22R, at least one tapering nozzle bucket 21N, a series of increasing in capacities of expansion chamber buckets 21, one or more combined expansion and exhaust buckets 21' and one scavenging bucket 21'' and/or at least one of said combined expansion and exhaust buckets 21' all arranged in series and cooperative with the adjacent row of oppositely arranged tangentially extending chambers 19 within the rotor 8, and wherein each of each of such groups the usual products of combustion are pressure velocity compounded; such stator further includes a series of cooling fins 24, and a pair of flanges 24 in the periphery thereof; an annular shaped cooling air inlet access 25' located at one end thereof and provided with an extension near the top of the casing 3 adjacent to the head-plate 15' and extending through said casing and one of said counterbores of the latter; and, preferably an oppositely located hot air outlet access 25 extending through said stator 3 and the other of said counterbores to the atmosphere.

As both said rotor 8 and said casing 3 are subjected to approximately similar relatively high temperatures of internal combustion, during the operation of the turbine, and as the casing 3 is externally cooled by the cooling fins 24, it is essential that the rotor 8 be cooled by forced circulation of air and preferably equipped with tapering helically extending cooling fins 8'''' located internally thereto.

Though it is obviously apparent that in relatively large internal combustion turbines of this type that the compressed fuel mixture could be supplied from a separate auxiliary compressor means to the individual fuel injection and/or delivery nozzles 23, it is equally as obvious that in relatively small internal combustion turbines of the type illustrated herein that such fuel mixture should be compressed by a compressor integral with the turbine assembly and that such compressor should normally be of a positive gear operative type of ample capacity to maintain a pressure equivalent to a compression ratio of approximately 8.0 under full power operating conditions, and wherein the gears of such compressor are fluid sealed, against compression pressure leakage there-around, by a combustible lubricant.

All turbines of this type regardless of their size, direction of rotation, whether controlled manually or by a mechanical or an electrically operated governor means, whether or not equipped with an integral or an independent fuel mixture compressor and regardless of the speed of, rotation of, or the power being delivered by, the turbine rotor, should all be provided with a constant, maximum allowable, delivery pressure on the fuel mixture being supplied to the delivery nozzles 23. For this reason the method of control of the speed of and power delivery of said turbine rotor should be by controlling the number of said delivery nozzles 23 in use and by shifting the ignition spark to the respective paired ignition plug or plugs of the delivery nozzle or nozzles being placed in use. In such turbines, having direct connected fuel mixture compressors as illustrated herein, such control should also include a synchronising control of the carburetor throttle-valve and/or the latter should be controlled independently by a pressure regulator operated by the pressure on the fuel mixture being delivered by the compressor for distribution to said delivery nozzles. At idling turbine speed, only one delivery nozzle should be in use and it should be operating at below full capacity of fuel mixture delivery and under consequently a reduced pressure that cannot normally be avoided. The discontinuance of the ignition spark under such conditions would cause the turbine rotor to stop rotating, however a discontinuance of said ignition spark while the nozzle was delivering its full capacity of compressed fuel mixture would not stop the train system of ignition unique to this particular type of turbine.

The direct connected fuel mixture compressor is of the multiple-gear combustible lubricant drenched positive type and such compressor assembly consists of: an elongated internally splined sun gear 12 of ample diameter and length to provide sufficient compressor capacity and provided to be a slidable-fit over the spline 11 of the tubular shaft 1 and a snug rotatable-fit within the central bore of the gear housing 4 and also between the head-plates 15' and 15''; a series of symmetrically spaced tubular shaped elongated planet gears 26 provided to each mesh with said sun gear 12 and to be each a snug rotatable-fit, within its respective cylindrical chamber, within said gear housing 4 and between said head-plates 15' and 15''; a series of elongated cylindrical pins 18 with one provided for each of said planet gears 26 and to be a press-fit there beyond into said head-plates 15' and 15'' and each to form a journal throughout its respective planet gear for the series of needle-type roller bearings 19' of each of said planet gears; a series of elongated cylindrical fuel mixture supply ports 27 and adjacent elongated grooves 28 provided in sets in the housing 4 and the head-plate 15'' with one set extending substantially the full length of and located adjacent to the out-meshing sides of each of said planet gears 26 with said sun gear 12 and each set provided to originate at one end within the cored fuel mixture supply compartment 29 in the head-plate 15''; a series of elongated cylindrical fuel mixture delivery ports 30 and adjacent elongated grooves 31 provided in sets in the housing 4 and the head-plate 15' with one set extending substantially the full length of and located adjacent to the in-meshing sides of each of said planet gears 26 with said sun gear 12 and each set provided to terminate within the cored fuel mixture receiver compartment 32 in the head-plate 15'; a resilient spring loaded excess pressure relief valve 33 located in said gear housing 4 and provided to be seated towards and to thereby have communication with one of said delivery ports 30 and to have communication, on the spring side thereof, with one of said supply ports 27; fuel mixture supply communication extending from the integral elbow carburetor 34 to the compartment 29 in the head-plate 15'' via the cored access passage 35 extending through the housing 15''' and one side of head-plate 15''; means in the form of a spray-nozzle assembly 36 threaded into the base of head-plate 15'' and provided for conveying a fuel-oil lubricant from the combined sump and reservoir 37 to the fuel mixture supply compartment 29 for purpose of spray drenching all of said gears 26 and 12 with a fuel-oil lubricant and thus providing a means of fluid sealing the clearance spaces around such gears; and, a means of automatically returning all excess fuel oil lubricant from the base of said fuel mixture accumulating compartment 32 to said sump 37 via a float-valve device 38 and a non-return resilient spring loaded check-valve assembly 39 arranged in series.

In order that the compressor gearing be efficient in compressing the fuel mixture, the following should be noted: the teeth 12' of the pinion gear 12 and the teeth 26' of the idling gears 26 should all be provided with the minimum allowable root-clearance, the gears should all be heat-treated and hardened, the finish of all gear teeth should be accomplished by the grinding process, both the lateral and the radial clearances of the gears in the gear housing should be as small as possible within allowances, and, a sufficient quantity of preferably a filtered fuel-oil lubricant should be supplied to the gears to both keep them well lubricated and to provide a means of fluid sealing the numerous clearance spaces and to thus prevent excess loss of pressure through the latter. It is believed further that with the use of fuel-oil for sealing purposes as just mentioned that a certain quantity of such fuel oil will become vaporized and will produce a more efficient combustion mixture and that eventually fuel oil may be used in lieu of gasoline in this type of turbine as a result of such fluid vaporizing mentioned.

As previously mentioned the control of the speed of and the power being developed in the turbine rotor 2 may be conveniently controlled by either one of two methods: the first method includes connecting the carburetor 34 throttle-valve 34' to a pressure regulator not illustrated, remotely operated from and by the pressure on the compressed fuel mixture in the accumulating compartment 32 and thus resulting in a constant automatically controlled pressure being carried on the latter, and further control including manual operated progressive distribution of such compressed fuel mixture to the individual fuel mixture delivery nozzles 23 and simultaneous distribution of ignition electricity to their respective ignition plugs 22 via the device 40; and, the second method, as illustrated, includes simultaneously remotely manually oscillating the carburetor throttle-valve 34' and the respective rotors 40' and 40'' of the combined fuel mixture and electrical ignition distributing device 40 via a plurality of rods 41 and bell-cranks 42 so that, starting at closed throttle turbine rotor idling speed with one fuel mixture delivery nozzle 23 receiving a fractional capacity distribution of compressed fuel mixture and its respective ignition plug 22 receiving ignition electricity, that each of said nozzles 23 and their respective ignition plugs 22 may be progressively placed into similar service as said throttle-valve 34' is progressively opened and said rotors 40' and 40'' are simultaneously progressively rotated by such manually operated control means, and including vice versa synchronising action and results as said throttle-valve and rotors are progressively rotated to their closed positions of operation.

The combined compressed fuel mixture and electrical ignition distributing device 40 consists of: an elongated main body member 43 provided to be secured to the top of head-plate 15' with the stud-bolts 44 and to be provided with a centrally located bore 43' closed at one end and provided with a cover 43'' at the opposite end and having communication with the compressed fuel mixture accumulating compartment 32 within said head-plate 15'; a tubular shaped bushing 45 pressed into bore 43' and provided with a slightly tapering bore 45' and a series of radially extending slots 45'' located on opposite sides therein and each having communication with an individual tube 46 of a series of the latter located on both sides of member 43 and preferably brazed and/or silver soldered in their respective access openings in the latter at one end thereof and extending to their respective predetermined fuel mixture delivery nozzles 23 at the other end thereof and connected to the latter with preferably, flared type tubing-fitting nuts 46'; an elongated sightly tapering, flanged otherwise tubular, shaped rotor 40' provided with two oppositely located radially extending valve-ports 40''' and provided for progressive distribution of said compressed fuel mixture to the delivery nozzles 23 via their respective tubes 46 in a predetermined sequence of distribution; an elongated dual diameter rod and/or shaft 47 provided to be a press-fit at its larger diameter within the hub of said flanged rotor 40' and to be pinned thereto the latter and to be provided with such length as to extend beyond said member 43 at both ends and connected at its larger diameter outer end to a bell-crank operating means 42' which in turn is connected via an adjustable rod 41' to the carburetor throttle-valve operating means; a plurality of packing glands 48 both enclosing shaft 47 and one located within said cover 43'' and the other pressed into the closed end of member 43; an electrically insulated cylindrical flanged ignition distributor rotor 40'' provided to be a press-fit over and to be pinned to the outer extending smaller diameter end of said shaft 47 and provided further to rotate within an elongated electrically insulated distributor head 49 secured concentrically with said shaft 47 to the closed end of said main body member 43; a pair of ignition wires and distributing connections 50 located on opposite sides of rotor 40'' along the vertical centerline of the outward projecting end of said distributor head 49 and provided to be connected to one each of the two ends of the secondary winding of one vibrating type of electrical induction coil 51; a pair of similar ignition wires and distributing connections 50' located on opposite sides of rotor 40'' along the horizontal centerline of and at the sides of said distributor head 49 and provided to be connected to one end each of the two ends of the secondary winding of a second vibrating type of ignition induction coil 51'; two series of electrical distribution connections and ignition wires with one series located in an arc on either side of the vertical centerline of the outward projecting end of said distributor head and each wire connected in a predetermined sequence to its respective ignition plug 22; a dual set of oppositely located pairs of electrical distribution segments 52 and 52' in the distributor rotor 40'' and provided one pair for each pair of said distributing wires 50 and 50' respectively; means of progressively increasing the number of fuel mixture delivery nozzles 23 in use and of supplying ignition electricity to their respective ignition plugs 22 as the carburetor throttle-valve 34' is opened and vice versa as said throttle-valve is closed; means in the form of the dual diameter shaft 47 for balancing the lateral thrust upon the tapering rotor 40'; and, means in the form of a pair of adjustable thrust collars 53, with one secured to the shaft 47 on either side of the bracket 53', for retaining said tapering rotor 40' freely rotatable within said tapering bore 45'.

The cycle of operation of each power cycle producing group within the bore 3B of said stator 3, as applying consecutively to each tangential bucket 19 in the adjacent row of same, to substantially consist of: an end to end scavenging thereof; supplying an explosive mixture charge therewithin; ignition and combustion of such charge; expansion of the products of combustion of each charge as it flows, under a reduced pressure and simultaneous increased volume and velocity therefrom such bucket into and through the adjacent tapering nozzle bucket 21N and into the preceding bucket 19, thence alternately back and forth into the adjacent stator buckets 21 and rotor buckets 19 in a cyclonic spiral form decreasing in pressure and simultaneously increasing in volume and velocity each time it passes through each bucket stage 21, and wherein its velocity is absorbed by the rotating rotor 8 each time it passes through one of the preceding buckets 19; and, finally void of kinetic energy it is exhausted via the exhaust and scavenging buckets 21' and 21'' to the atmosphere via the exhaust compartment 20 as diagrammatically illustrated in Fig. 10.

The action within this internal combustion turbine is similar to that of a modern flexible steam turbine wherein a constant supply pressure is available, and additional power is applied by placing additional nozzles in use to meet the increasing torque load conditions.

With reference to Figs. 1 to 4 inclusive, the turbine assembly is provided to form an axle housing extending between two opposite traction wheels of an automotive vehicle wherein each wheel assembly is preferably a part of a combined hydrodynamical, compounded planetary gearing driven, internal fluid pressure variable and reversible transmission coupler capable of an extreme gearing ratio range extending between a ratio of around 360 to 1, and a ratio of 1 to 1. The turbine is connected to such wheel assemblies by the following means: the housings 15 and 15''' provided with flanges 54 and 54' respectively are bolted to similar adjacent flanges 55 and 55' forming a part of each hydrodynamical coupler shaft housing 56 and 56' respectively of each opposite wheel assembly; a plurality of wiper fluid seals are provided in pairs with one pair of seals 57 within the bore at the outer ends of 15 and 15''' adjacent the roller bearings 58 and adjustment nuts 59, and bearing against the outer surface of the adjacent stub-shafts 60, which latter are splined into the rotor shaft 1; and, a hinged access cover 62 is provided over the turbine. Numerous miscellaneous auxiliary items illustrated and used in connection with the turbine assembly include the following: a lubricating fluid pump 63 operatable from the worm 10; a combined float and electrical potentiometer assembly 64 for indicating the circulating fluid level; a combined electrical generator and starting motor assembly 65 connected via a silent type of chain 65' to the sprocket gear 10'; et cetera.

It should be understood that the illustrated method of application of this turbine assembly is only one of many possible methods of its application and use in connection as a motive power means, and it is obvious that such an assembly could be used for many purposes. The assembly would be particularly adaptable as a direct drive means for an electrical generating unit, due to the fact that it would be more efficient at a higher rate of speed.

Thus having fully described my invention, I claim:

1. In an internal combustion turbine having a stator and a cylindrical rotor rotatable in one direction therewithin and wherein said rotor is equipped with at least one row of tangential chambers open at the periphery thereof, and wherein said stator is equipped with means connected therewith for consecutively introducing a series of explosive charges into, and of igniting each such charge within, each of said chambers during each revolution thereof said rotor, the provision therein and therewith of: a series of groups of consecutively progressively increasing in capacities of tangential buckets each extending internally into said stator and open to said periphery of said rotor opposite to said tangential chambers and cooperative consecutively therewith the latter, and wherein the smallest capacity of each group of series of said tangential buckets are each located adjacent to and in series with an ignition means which latter in turn is in series with an adjacent fuel mixture charging means of each such group, and wherein the largest capacity of each of said series of buckets in each of said series of groups are open via an exhaust compartment to the atmosphere; and, means, associated with and occuring within each of said groups for forming a complete internal combustion cycle of operations therewithin for each of said explosive charges introduced into and ignited within each of said tangential chambers consecutively within each of such respective groups.

2. The device of claim 1 characterized by, each of said internal combustion cycle of operations to briefly consist, during the rotation of said rotor, of consecutively scavenging, then fully charging each respective consecutive chamber with an explosive charge, then igniting such charge within said chamber, then pressure velocity compounding the products of combustion of said explosive charge, in a cyclonic spiral manner, as such products flow, from said chamber, alternately into and out of each increasing in capacity of said series of buckets, of such respective group, and into and out of each preceding chamber, and, ultimately into the atmosphere via said exhaust compartment.

3. The device of claim 1 characterized by, said series of groups of consecutively progressively increasing in capacities of tangential buckets, each open to said rotor periphery opposite to said tangential chambers and cooperative consecutively therewith the latter, thus forming a means, by respective groups and during the rotation of said rotor, whereby each explosive charge, introduced into and ignited within each consecutive tangential chamber respectively, via and by said fuel mixture charging means and said ignition means in series with each such respective group, first undergoes complete combustion within its respective consecutive chamber, subsequent to ignition therewithin and preceding the cooperation of such chamber consecutively with each of said increasing in capacities of tangential buckets within such respective group, then is abruptly expanded and increased correspondingly in volume and velocity as it flows, in the form of kinetic energy, into and through the smallest of said tangential buckets in said group and on into the next preceding of said tangential chambers, et cetera into the next succeeding larger capacities of said tangential buckets and next preceding succeeding tangential chambers alternately respectively, and until it is ultimately exhausted to the atmosphere via the largest capacity of said tangential buckets in such respective group, and whereupon said respective chamber is then scavenged, of any remaining portion of such spent charge, as it enters the next succeeding of such groups, and, thus completes one internal combustion cycle of operations of one of said explosive charges in one of said groups.

4. The device of claim 1 characterized by, said series of consecutively progressively increasing in capacities of tangential buckets in each of said groups as combined with said fuel mixture charging means and said ignition means in series therewith each such respective group, forms a means whereby, during the rotation of said rotor, each of said explosive charges, consecutively introduced into and ignited within each of said tangential chambers within each respective group, is pressure velocity compounded subsequent to its ignition within and preceding its exhaust from its respective group, and, during the consecutive cooperation between its respective tangential chamber and said consecutively progressively increasing in capacities of tangential buckets within such respective group of same.

5. In an internal combustion turbine having a stator and a cylindrical rotor rotatable in one direction therewithin and wherein said rotor is equipped with at least one row of tangential chambers open at the periphery thereof, and wherein said stator is equipped with means connected therewith for consecutively introducing a series of explosive charges into, and of igniting each such charge within, each of said chambers during each revolution thereof said rotor, the combination and provision therein and therewith of: a series of groups of consecutively progressively increasing in capacities of tangential buckets each extending internally into said stator and open to said periphery of said rotor opposite to said tangential chambers and cooperative consecutively therewith the latter, and wherein the smallest capacity of each group of series of said tangential buckets are each located adjacent to and in series with an ignition means which latter in turn is in series with an adjacent fuel mixture charging means of each such group, and wherein the largest capacity of each of said series of buckets in each of said series of groups are open via an exhaust compartment to the atmosphere; and, means associated with and occurring within each of said groups for forming a complete internal combustion cycle of operations therewithin for, and including the pressure velocity compounding of, each of said explosive charges introduced into and ignited within each of said tangential chambers consecutively within each of such respective groups.

6. In an internal combustion turbine having an annular shaped stator and a cylindrical rotor rotatable in one direction therewithin, and wherein said rotor is equipped with at least one row of tangential chambers open at the periphery thereof, the combination and provision therein and therewith of: a series of groups of consecutively progressively increasing in capacities of tangential buckets each extending internally into said stator and open to said periphery of said rotor opposite to and cooperative consecutively therewith said tangential chambers, and wherein the smallest capacity of each group of series of said tangential buckets are each located adjacent to and in series with a pair of means each extending through said stator and respectively provided, during the rotation of said rotor, for consecutively introducing a series of exposive charges into, and of igniting each such charge within each of said tangential chambers as the latter are carried, by said rotor, consecutively therepast such respective group, and wherein the largest capacity of each of said series of buckets in each of said series of groups are open via an exhaust compartment to the atmosphere; and, means associated with and occuring within each of said groups for forming a complete internal combustion cycle of operations therewithin for, and including the pressure velocity compounding of, each of said explosive charges introduced into and ignited within each of said tangential chambers consecutively within each of such respective groups.

7. In an internal combustion turbine having an annular shape stator and a cylindrical rotor rotatable in one direction therewithin, and wherein said rotor is equipped with at least one row of tangential chambers open to the periphery thereof, and wherein said stator is equipped with at least one row of tangential diffuser nozzles open to said rotor periphery and provided for the introduction of a series of explosive charges consecutively into each of said tangential chambers during the rotation of said rotor, and wherein said stator is further equipped with at least one row of ignition plugs each paired and alternated with said nozzles in said row and each having access to said rotor periphery adjacent to its respective paired nozzle and in series therewith in the direction of rotor rotation, the combination therewith of: means for supplying a compressed elastic fuel mixture and ignition electricity progressively consecutively, in a predetermined sequence, respectively to each of said nozzles and their respective paired ignition plugs through a combined distribution device provided with a distributing valve and an ignition distributor disk mounted coaxially in tandem upon an oscillatable shaft common to both and manually operatable in conjunction with the throttle-valve of a conventional carburetor; and, means in the form of a multiple geared, planetary type of combustible lubricant drenched, elastic fuel mixture compressor provided to extend in tandem with said turbine and having a sun drive gear rotatable coaxially in tandem with said rotor, and wherein said compressor takes suction through said carburetor, and including an oil spray-nozzle means, and discharges via an accumulator and said distribution device to each of said diffuser nozzles.

8. The device of claim 7 characterized by, said oil spray-nozzle means included in the suction of said compressor to be connected to an adjacent sump reservoir containing a combustible liquid lubricant that is introduced into said compressor for fluid sealing and lubricating the gears thereof such compressor, and, wherein the surplus of such fluid is automatically returned to said sump via a float-valve opening between said accumulator and said sump.

9. In an internal combustion turbine having an annular shaped stator and a cyclindrical rotor rotatable in one direction therewithin, and wherein said rotor is equipped with at least one row of chambers open to the periphery thereof, and wherein said stator is equipped with at least one row of alternate pairs of fuel mixture diffuser nozzles and ignition plugs each opening adjacent to said rotor periphery, and each pair symmetrically spaced about the axis of said rotor and provided respectively, during each revolution of the latter, for consecutively introducing an explosive charge into, and for igniting such charge within each of said chambers, the combination and provision therein and therewith of: a series of groups, of series of consecutive, progressively increasing in capacities of tangential buckets machined into said sator, in opposite to the direction of rotor rotation, and consecutively cooperating with each of said chambers; and, wherein each of said series of groups consists consecutively of, one of said diffuser nozzles and its mate ignition plug, and one series of said tangential buckets, and wherein the latter at least one of the largest capacity thereof opens into an exhaust access to the atmosphere.

10. In an internal combustion turbine having an annular shaped stator and a cylindrical rotor rotatable in one direction therewithin, and wherein said rotor is equipped with at least one row of chambers open to the periphery thereof, the combination and provision therein and therewith of: a series of groups of means each in series and located within said stator and opening adjacent to said rotor periphery, and each cooperative in conjunction with each of said chambers consecutively, during the rotation of said rotor, and thus forming an individual means whereby and wherein a series of consecutive operations are formed into a complete internal combustion cycle of operations; and, wherein each such group means consists consecutively of a diffuser nozzle for simultaneously introducing an explosive charge into and scavenging each of said chambers, an ignition plug for igniting each of said charges and thus initiating combustion within each such chamber, a predetermined number of progressively increasing in capacities of tangential buckets, provided with a predetermined number of the larger capacity having access with the atmosphere and, wherein the consecutive cooperation of each of said buckets, with each of said chambers, results in the pressure velocity compounding of the products of combustion of each explosive charge previously introduced into each of said chambers.

11. An internal combustion turbine assembly forming the intermediate portion extending between the axle housings of two opposite traction wheels of an automotive vehicle, and comprising in combination; a turbine rotor, rotatable in one direction in a stator, in tandem with the drive sun-gear of a multiple geared, planetary type of oil drenched, elastic fuel mixture compressor which supplies compressed fuel mixture to said turbine and which compressor is provided with a gearing housing extending jointly in tandem with said stator and thus forms said intermediate portion of said axle housing.

12. In an internal combustion turbine having an annular shaped stator and a cylindrical rotor rotatable in one direction therewithin, and wherein said rotor is equipped with a pair of rows of chambers open to the periphery thereof, and wherein said stator is equipped with a pair of rows of alternate pairs of fuel mixture diffuser nozzles and ignition plugs each opening adjacent to said rotor periphery, and each pair of said nozzles and plugs symmetrically spaced about the axis of said rotor and provided respectively, during each revolution of the latter, to consecutively introduce an explosive charge into, and to ignite such charge within each adjacent of said chambers, the combination and provision therein and therewith of: a pair of rows of series of groups, of series of consecutively progressively increasing in capacities of tangential buckets, extending in curved shape into said stator in opposite to the direction of rotor rotation, and consecutively co-operating with each adjacent of said chambers in the adjacent row of the same; wherein each of said series of groups in each row of the same consists consecutively of, one of said diffuser nozzles and its mate ignition plug, and one series of said tangential buckets, and wherein the latter a plurality of the larger capacity thereof opens into an exhaust access to the atmosphere; means of supplying compressed elastic fuel mixture and ignition electricity jointly, in a predetermined sequence, respectively to each of said nozzles and its respective paired ignition plug through a combined distribution device provided with a fuel mixture distributing valve and an ignition distributor rotor mounted coaxially in tandem upon an oscillatable shaft common to both and manually operatable; and means in the form of a multiple geared, planetary type of combustible liquid drenched, elastic fuel mixture compressor provided to extend in tandem with said turbine and having a sun drive gear rotatable coaxially in tandem with said cylindrical rotor, and wherein said compressor takes suction through a carburetor and an oil spray-nozzle means, and discharges via an accumulator and said distribution device to each of said diffuser nozzles.

13. The device of claim 12, characterized by, each of said series of consecutively progressively increasing in capacities of tangential buckets cooperative consecutively with each adjacent of said chambers, as combined within its respective group in series with one of said diffuser nozzles and its mate ignition plug thus forming a means whereby, during the rotation of said cylindrical rotor, said compressed elastic fuel mixture is first introduced into each adjacent of said chambers via such group diffuser nozzle in the form of a combustible charge, which latter is then ignited by such paired group ignition plug and thereby starts the combustion of said charge and wherein the resulting products of combustion is then pressure velocity compounded as it is expanded and increases in volume while flowing, in a cyclonic manner, alternately into and out of the succeeding series of said buckets and into and out of the preceding of said adjacent chambers subsequently to such ignition of said charge, and preceding the exhaust of said products from such respective group into the atmosphere.

14. The device of claim 12 characterized by, said means of supplying compressed elastic fuel mixture and ignition electricity jointly, in a predetermined sequence, respectively to each of said nozzles and its respective paired ignition plug through said combined distribution device which is manually operatable, thus forming a means whereby any number, of the total, of such nozzles and their paired ignition plugs may be placed into and out of service at will.

FRANK DAVID BUTLER.

References Cited in the file of this patent

UNITED STATES PATENTS

| Number | Name | Date |
| --- | --- | --- |
| 800,684 | Schneider | Oct. 3, 1905 |
| 1,671,967 | Butler | June 5, 1928 |
| 2,039,210 | Bugatti | Apr. 28, 1936 |
| 2,310,513 | Burns | Feb. 9, 1943 |
| 2,554,593 | Sédille | May 29, 1951 |
| 2,614,391 | Pavlecka | Oct. 21, 1952 |